(12) United States Patent
Breuer et al.

(10) Patent No.: US 7,678,352 B2
(45) Date of Patent: Mar. 16, 2010

(54) DEVICE AND PROCEDURE FOR THE PRODUCTION OF AMMONIA

(75) Inventors: Norbert Breuer, Ditzingen (DE); Stefan Woerz, Vaihingen/Enz (DE); Andreas Genssle, Musberg (DE); Peter Riegger, Stuttgart (DE); Franz-Josef Trompeter, Freiberg A.N. (DE); Thomas Hauber, Altbach (DE); Markus Hernier, Gerlingen (DE); Ralf Wegst, Gaggenau (DE); Thorsten Raatz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 11/602,898

(22) Filed: Nov. 20, 2006

(65) Prior Publication Data

US 2007/0202031 A1    Aug. 30, 2007

Related U.S. Application Data

(63) Continuation-in-part of application No. 11/599,645, filed on Nov. 14, 2006, and a continuation-in-part of application No. 11/599,888, filed on Nov. 14, 2006, now Pat. No. 7,559,195, and a continuation-in-part of application No. 11/599,899, filed on Nov. 14, 2006, and a continuation-in-part of application No. 11/599,887, filed on Nov. 14, 2006, and a continuation-in-part of application No. 11/599,898, filed on Nov. 14, 2006, now Pat. No. 7,614,220.

(30) Foreign Application Priority Data

| Nov. 14, 2005 | (DE) | 10 2005 054 129 |
|---|---|---|
| Dec. 27, 2005 | (DE) | 10 2005 062 556 |
| Apr. 24, 2006 | (DE) | 10 2006 018 955 |
| May 4, 2006 | (DE) | 10 2006 020 693 |
| May 9, 2006 | (DE) | 10 2006 021 490 |
| May 11, 2006 | (DE) | 10 2006 021 987 |
| May 12, 2006 | (DE) | 10 2006 022 385 |
| May 17, 2006 | (DE) | 10 2006 022 992 |
| May 18, 2006 | (DE) | 10 2006 023 338 |
| Sep. 14, 2006 | (DE) | 10 2006 043 082 |
| Sep. 14, 2006 | (DE) | 10 2006 043 087 |
| Sep. 14, 2006 | (DE) | 10 2006 043 099 |
| Sep. 14, 2006 | (DE) | 10 2006 043 100 |
| Sep. 14, 2006 | (DE) | 10 2006 043 101 |
| Sep. 14, 2006 | (DE) | 10 2006 043 104 |

(51) Int. Cl.
*B01D 53/56* (2006.01)
*B01D 53/94* (2006.01)
*F01N 3/10* (2006.01)

(52) U.S. Cl. ............. 423/213.2; 423/213.5; 423/239.1; 60/274; 60/282; 60/299; 60/301; 60/302

(58) Field of Classification Search ............. 423/213.2, 423/213.5, 239.1; 60/274, 282, 299, 301, 60/302

See application file for complete search history.

(56) References Cited

U.S. PATENT DOCUMENTS

| 6,322,757 | B1 | 11/2001 | Cohn et al. | |
|---|---|---|---|---|
| 6,662,552 | B1 * | 12/2003 | Gunther et al. | 60/286 |
| 7,240,484 | B2 * | 7/2007 | Li et al. | 60/286 |
| 7,254,939 | B2 * | 8/2007 | Duvinage et al. | 60/286 |
| 2006/0101809 | A1 * | 5/2006 | Bodo et al. | 60/286 |
| 2007/0274892 | A1 * | 11/2007 | Duvinage et al. | 423/239.2 |
| 2008/0102010 | A1 * | 5/2008 | Bruck et al. | 423/213.2 |
| 2008/0166283 | A1 * | 7/2008 | Vitse et al. | 423/239.1 |

FOREIGN PATENT DOCUMENTS

| DE | 199 22 961 C2 | 11/2000 |
|---|---|---|
| DE | 101 39 142 A1 | 2/2003 |
| DE | 102 37 777 | 2/2004 |
| DE | 103 13 704 | 10/2004 |
| EP | 1 395 351 | 3/2004 |
| WO | WO 01/14702 | 3/2001 |
| WO | WO 2004/071646 | 8/2004 |

OTHER PUBLICATIONS

Werner Weisweiler, "Elimination of Nitrogen Oxides from Oxygen-Containing Automotive Exhaust Gases", Chemistry Engineer Technology, vol. 72, Issue 5, pp. 441-449, 2000.

\* cited by examiner

*Primary Examiner*—Timothy C Vanoy
(74) *Attorney, Agent, or Firm*—Merchant & Gould P.C.

(57) ABSTRACT

Devices and methods for the production of ammonia as a reducing agent for the selective catalytic reduction (SCR) of nitrogen oxides in the exhaust gas of a combustion source, especially of an internal combustion engine. The ammonia is admixed with the exhaust gas in the direction of flow in front of a SCR-catalytic converter. In so doing, nitrogen oxide is produced in a nitrogen oxide production unit separated from the combustion source and its exhaust gas duct and is stored in at least one storage catalytic converter or a nitrogen oxide storage and a subsequently connected catalytic converter. Furthermore, hydrogen and/or a hydrogen-carbon monoxide-mixture is produced in a hydrogen production unit separated from the combustion source and its exhaust gas duct and delivered to a storage catalytic converter. Hydrogen and the stored nitrogen oxide are converted catalytically to ammonia in the storage catalytic converter or in the catalytic converter.

34 Claims, 2 Drawing Sheets

DEVICE AND PROCEDURE FOR THE PRODUCTION OF AMMONIA

This application is a continuation-in-part of U.S. patent application Ser. No. 11/599,645, filed on 14 Nov. 2006 and entitled "Emission Control System for a Motor Vehicle"; a continuation-in-part of U.S. patent application Ser. No. 11/599,888, filed on 14 Nov. 2006, now U.S. Pat. No. 7,559,195 and entitled "Procedure and Device to Heat a Reducing Agent Generation System"; a continuation-in-part of U.S. patent application Ser. No. 11/599,899, filed on 14 Nov. 2006 and entitled "Process for Reducing Agent Control in an Exhaust Gas Aftertreatment System"; a continuation-in-part of U.S. patent application Ser. No. 11/599,887, filed on 14 Nov. 2006 and entitled "Control of Air Flow for Apparatus to Produce Reduction Agents"; and a continuation-in-part of U.S. patent application Ser. No. 11/599,898, filed on 14 Nov. 2006 now U.S. Pat. No. 7,614,220 and entitled "Procedure for Controlling the Reducing Agent in an Exhaust Gas Post-processing System," the entireties of which are hereby incorporated by reference.

The invention concerns a device or a nitrogen oxide storage and a downstream catalytic converter for the production of ammonia as a reducing agent for the selective catalytic reduction (SCR) of nitrogen oxides in the exhaust gas of a combustion source, particularly of an internal combustion engine, whereby the ammonia is admixed with the exhaust gas in the direction of flow in front of the SCR-catalytic converter.

The invention additionally concerns a procedure to produce ammonia as a reducing agent for the selective catalytic reduction (SCR) of nitrogen oxides in the exhaust gas of a combustion source, especially of an internal combustion engine, whereby the ammonia is admixed with the exhaust gas in the direction of flow in front of an SCR-catalytic converter.

In connection with future legal specifications with regard to the nitrogen oxide emissions of motor vehicles, a corresponding exhaust gas aftertreatment is required. The selective catalytic reduction can be deployed to decrease the $NO_x$ emissions (denitrogenation) of internal combustion engines, especially of diesel motors with chronologically predominantly lean, i.e. oxygen rich exhaust. In so doing, a defined amount of a selective acting reducing agent is added to the exhaust gas. This can, for example, be in the form of ammonia, which is metered directly in a gaseous form, or also obtained from a precursor substance in the form of urea or from a urea-water-solution (HWL).

In the German patent DE 10139142 A1 an emission control system of an internal combustion engine is described, in which an SCR-catalytic converter is deployed for the reduction of the $NO_x$ emissions. The SCR-catalytic converter reduces the nitrogen oxides contained in the exhaust gas to nitrogen with the reducing agent ammonia. The ammonia is obtained from a urea-water-solution (HWL) in a hydrolysis catalytic converter disposed upstream in front of the SCR-catalytic converter. The hydrolysis catalytic converter converts the urea contained in the HWL to ammonia and carbon dioxide. In a second step the ammonia reduces the nitrogen oxides to nitrogen, whereby water is produced as a by-product. The exact operational sequence is adequately described in the trade journals (ref. WEISSWELLER in CIT (72), pages 441-449, 2000). The HWL is provided in a reducing agent tank.

The disadvantage of this procedure is that the HWL is consumed during operation of the internal combustion engine. The consumption thereby lies at approximately 4% of the fuel consumption. The urea-water-solution would have to be supplied accordingly over a vast area, for example at gas stations. A further disadvantage of the procedure lies with the necessary operating temperature range. The thermolysis reaction of the urea-water-solution takes place only at temperatures above 130° C. and the hydrolysis reaction for the conversion of hydrogen and nitrogen oxide to ammonia at the hydrolysis catalytic converter only in the range of 200° C. to 220° C. These temperatures in the exhaust gas are, for example, achieved in diesel engines only after a protracted operational time duration. Due to eliminations, blockages at the metering unit can occur at temperatures below 200° C., which can at least impede the supply of urea-water-solution into the exhaust gas duct. Furthermore, a metering of the urea-water-solution at temperatures under 200° C. can lead to the inhibition of the necessary catalytic characteristics at the hydrolysis catalytic converter or at the SCR-catalytic converter due to a polymerization.

In the German patent DE 199 22 961 C2 an emission control system for the purification of the exhaust gas of a combustion source is described, particularly of the internal combustion engine of a motor vehicle, at least from the nitrogen oxides contained in it with an ammonia production catalytic converter for the production of ammonia using components of at least a part of the exhaust gas emitted from the combustion source during the ammonia production operation phases and a nitrogen oxide reducing catalytic converter connected downstream from the ammonia production catalytic converter for the reduction of nitrogen oxides contained in the exhaust gas emitted from the combustion source using the ammonia produced as a reducing agent. Provision is made for a nitrogen oxide production unit external to the combustion source for the enrichment of the exhaust gas fed to the ammonia production catalytic converter with the nitrogen oxide produced by it during the ammonia production operating phases. A plasma generator is, for example, proposed as a nitrogen oxide production unit for the plasma engineered oxidation of the nitrogen, contained in a gas stream fed to the unit, into nitrogen oxide. The hydrogen required for the ammonia production is produced during the ammonia production operating phases by the operation of a combustion source with a rich, i.e. fuel rich air ratio.

A disadvantage of this procedure is the relatively high fuel consumption during the necessary rich operating phases. Furthermore, a high energy requirement is necessary to supply the nitrogen oxide external to the motor, especially as the nitrogen oxide must be produced in high concentration during the shortest possible ammonia production operating phases and the remaining residual oxygen for the production of ammonia must be removed in an energy costly manner. If the hydrogen is produced by way of a $PO_x$ catalytic converter through a partial oxidation reformation (POX), an additional disadvantage lies with the still insufficient dynamic of the hydrogen production.

A plasma chemical procedure for the production of a hydrogen rich gas mixture is described in the patent WO 01/14702 A1. A rich fuel-air-mixture is thereby dealt with in an arc, preferably under POX conditions.

It is the task of the invention to provide a device of the kind described at the beginning of the application, which allows for the production of ammonia with little energy expense from the operating resources of the combustion source.

It is furthermore the task of the invention to provide a suitable procedure to this device.

The task concerning the device of the invention is thereby solved, in that provision is made for one nitrogen oxide production unit separated from the combustion source and its exhaust gas duct and a hydrogen production unit separate from the combustion unit and its exhaust gas duct and that the nitrogen oxide of the nitrogen oxide production unit and the hydrogen of the hydrogen production unit are delivered at least to a storage catalytic converter or a nitrogen oxide catalytic converter and a downstream catalytic converter for the storage of the nitrogen oxide and for the formation of ammonia. The ammonia production, thus, takes place outside of the exhaust gas tract without an intervention into the operating condition. In the case of the internal combustion engine, no provision must be made for fuel consumption intensive, rich operating phases for the production of the hydrogen required for the ammonia synthesis. The internal combustion engine can be operated in a condition optimized for consumption. The storage of the produced nitrogen oxide in a nitrogen oxide storage reduces the energy expense for ammonia production compared to the state of the art. Furthermore, because of this storage, the energy intensive combustion of the residual oxygen, which remains during the formation of nitrogen oxide, is omitted.

In an advantageous embodiment of the invention, the nitrogen oxide storage and the catalytic converter are integrated into a structural unit. In so doing, the structural form can be especially compactly selected.

In that fuel and/or a fuel-air-mixture and/or a fuel-air-exhaust gas-mixture is delivered to a hydrogen production unit, and air and/or exhaust gas is delivered to a nitrogen oxide production unit, ammonia is obtained from already existing operating material of the combustion source. Additional operating material, as, for example, a urea-water-solution, does not have to be transported. Water can be deployed for the production of hydrogen as an additional oxidation agent for the oxygen in the air. This can, for example, can be implemented by a fuel-exhaust-mixture, which has this water proportion.

In a cost effective embodiment of the invention with a small number of required components and an especially space saving construction, provision is made for a combined hydrogen-nitrogen oxide-production unit for the alternating production of hydrogen and nitrogen oxide. The production of ammonia during the alternating provision of hydrogen and nitrogen oxide is made possible by a storage catalytic converter, in which during the nitrogen oxide production the nitrogen oxide is stored and during the hydrogen production the conversion to ammonia results.

A continuous ammonia production is thereby achieved, in that the hydrogen production unit and the nitrogen oxide production unit are embodied as separate units, and in that provision is made for at least two storage catalytic converters for the storage of nitrogen oxide and the formation of ammonia, whereby the hydrogen production unit and the nitrogen oxide production unit are connected alternately by way of gas routes, which are reversible. The nitrogen oxide production unit and the hydrogen production unit can be optimally constructed for their task. The amount of hydrogen and nitrogen oxide produced per time unit can be selected smaller in a continuous operation with separate production units as in the respective operating phase (hydrogen or nitrogen oxide production) during an alternating operation with a production unit, which leads to a smaller energy expense as a whole.

In a preferred form of embodiment of the invention, the storage catalytic converter, of which there is at least one, is accomplished as a nitrogen oxide storage with an additional noble metal setting. In so doing, the nitrogen oxide storage and the noble metal can be applied to a monolith similar to a known Nitrogen Storage Catalyser (NSC). The noble metal causes the catalytic transformation of the stored nitrogen oxide and the hydrogen, which has been supplied, to ammonia.

A good storage effect for the nitrogen oxide and an efficient catalytic conversion of the stored nitrogen oxide and the hydrogen to ammonia can thereby be achieved, in that the nitrogen oxide storage is accomplished with a carbonate as an active storage component, especially barium carbonate, barium oxide or sodium carbonate and/or the noble metal setting is embodied as a platinum setting. Alternatively to the aforementioned processes, gaseous and liquid or additional solid nitrogen oxide absorbers are conceivable. The noble metal setting can be accomplished with other materials, which cause a reduction of nitrogen oxides to ammonia by means of hydrogen.

A cost effective production of hydrogen and nitrogen oxide with little energy expense can thus be achieved, in that the hydrogen production unit and/or the nitrogen oxide production unit is implemented as a plasma reactor. Depending upon the selected mode of operation, with a plasma reactor hydrogen as well as nitrogen oxide can be produced at a high production rate, so that an alternating operation as a hydrogen production unit and as a nitrogen oxide production unit with a plasma reactor can be implemented.

If the hydrogen production unit can be operated under $POx$ conditions, consequently the hydrogen production unit is provided with a fuel-air-mixture with a Lambda smaller than 1, especially a Lambda between 0.33 and 0.66, the hydrogen and carbon monoxide are, thus, produced, which reduce the stored nitrogen oxide in the storage catalytic converter to ammonia.

Provision is made according to a preferred embodiment variation of the invention for the hydrogen production unit to be executed as a thermal vaporizer for the fuel with a reformation catalytic converter subsequently connected. In this way, stored residual heat, for example from the operational phase of the nitrogen oxide production, can be used for the vaporization of the fuel. The reformation of the fuel, that is to say the conversion of the fuel into a gas mixture containing hydrogen, takes place at the reformation catalytic converter.

The residual heat from the operational phase of the nitrogen oxide can thereby be made use of, in that at least an electrode of the plasma reactor is implemented as a thermal vaporizer for the fuel. In so doing, the fuel is partially atomized and sprayed onto the electrode and further atomized and vaporized there. The heating capacity of the electrode is to be so selected, that the stored amount of heat is sufficiently large for the vaporization of the required amount of fuel.

In a further embodiment of the invention, the electrode of the plasma reactor, of which there is at least one, is implemented as a hollow electrode, in which the fuel is delivered to the electrode. The fuel is fed targeted to the hot electrode with minimal losses.

If the stored heat energy of the thermal vaporizer is not sufficient to vaporize the fuel or if additionally the contact time of the fuel with the hot surface area of the thermal vaporizer is too short for a sufficient heat transformation, provision can be made for a counter current heat exchanger to transform the heat energy from a product gas emitted from the reformation catalytic converter or a gas stream emitted from the plasma reactor to a reactant gas of air and fuel fed to the thermal vaporizer. The fuel delivered to the thermal vaporizer, respectively the fuel-air-mixture delivered is advantageously heated so much, that the fuel at least partially vaporizes. The heat energy necessary for a complete vaporization can then be transferred to the fuel in the thermal vaporizer.

If during the thermal vaporization of the fuel, the plasma reactor is turned off, the necessary electrical energy to maintain the plasma is saved during this operational phase. This leads, for example, in motor vehicles with lean motors to a reduction of the increased fuel consumption resulting from the exhaust gas aftertreatment with the ammonia SCR-process.

In a preferred form of embodiment of the invention, provision is made for the plasma reactor to be turned on during the thermal vaporization of the fuel and for the fuel and/or a fuel-air-mixture and/or a fuel-air-exhaust gas-mixture to be delivered to an area in the direction of flow after the plasma zone. By injection of the fuel in a hot gas with surrounding hot walls, such a sufficiently quick vaporization and a mixture formation can be implemented, which ideally lead to a virtually rectangular supply of a product gas containing hydrogen and carbon monoxide. By means of the continuous plasma operation, a sinking of the temperature of the fuel introduction in the rich phase under the necessary vaporization temperature of the fuel can be avoided. Furthermore, the continuous plasma operation prevents the temperature of the reformation catalytic converter from sinking under the ignition temperature. An additional advantage results from the fact, that no injection of fuel occurs into the plasma zone, whereby the generation of undesirable products is avoided. An undesirable and uncontrolled conversion of the hydrocarbons to materials other than to hydrogen and carbon monoxide can be avoided, because only the temperature from the thermalization of the power introduced into the plasma can be used for the vaporization and mixture formation; and the reformation completely to hydrogen and carbon monoxide is achieved at the subsequent reformation catalytic converter.

If air guidance cross members are disposed in an air feed in the direction of flow in front of the thermal vaporizer for the fuel and/or in front of the reformation catalytic converter, a prerotation can thus be impressed on the gas stream, which leads to an improved homogeneity of the fuel vapor-air-mixture. The place at which the fuel is vaporized can thus be located in an area with high flow velocity and/or high velocity gradients, which improves the mixture formation. Furthermore, through the prerotation the oncoming flow to the reformation catalytic converter is improved and an admission of the reformation catalytic converter with liquid fuel is avoided.

If the SCR-catalytic converter is designed as an ammonia storage, ammonia demand peaks can be intercepted by the ammonia stored in the SCR-catalytic converter. The ammonia production can thus be limited to median ammonia consumption.

The task of the invention concerning the procedure is thereby solved, in that nitrogen oxide is generated in a nitrogen oxide production unit separated from the combustion source and its exhaust gas duct and is stored in at least a storage catalytic converter, and in that hydrogen and/or a hydrogen-carbon monoxide-mixture is generated in a hydrogen production unit separated from the combustion source and its exhaust gas duct and is delivered to a storage catalytic converter or a nitrogen oxide storage and a subsequently connected catalytic converter and in that the hydrogen and the stored nitrogen oxide are catalytically converted to ammonia in the storage catalytic converter or the catalytic converter. The ammonia production takes place independently of the respective operating state of the combustion source, for example of an internal combustion engine. No intervention into the operating state of the combustion source is necessary. This allows for a consumption optimized operation of the combustion source. The storage of the generated nitrogen oxide and the subsequent catalytic conversion with the generated hydrogen in the storage catalytic converter allows for an ammonia generation with a relatively low energy expense, especially as an otherwise necessary combustion of the residual oxygen, which remains in the nitrogen oxide formation is not necessary.

If hydrogen and/or a hydrogen-carbon monoxide-mixture in the hydrogen production unit is produced from fuel and/or from a fuel-air-mixture and/or from a fuel-air/exhaust gas-mixture and if nitrogen oxide is produced in the nitrogen oxide production unit from air and/or from exhaust gas, only operating material of the internal combustion engine is used. No additional operating material has to be supplied, respectively transported.

In a preferred form of embodiment of the invention, which can be implemented with a small number of required components, nitrogen oxide and hydrogen or a hydrogen-carbon monoxide mixture are alternately produced in a combined hydrogen-nitrogen oxide-production unit, whereby the nitrogen oxide during the nitrogen oxide production phase is stored in the storage catalytic converter and in the hydrogen production phase, hydrogen is converted to ammonia. This intermittent ammonia production is only made possible by the storage of nitrogen oxide in the storage catalytic converter and the conversion with the subsequently generated hydrogen.

In an alternative form of embodiment, hydrogen and nitrogen oxide from two separate hydrogen-and-nitrogen oxide production units are alternatively delivered to two downstream storage catalytic converters for the alternating storage of the nitrogen oxide and the production of the ammonia, whereby the allocation of the gas streams to the storage catalytic converters takes place over reversible gas routes. The procedure allows for a continuous supply of ammonia for the reducing of the nitrogen oxides in the exhaust gas of the combustion source.

A simple possibility for the supply of the necessary reactants, hydrogen and nitrogen oxide, is that the hydrogen or a hydrogen-carbon monoxide mixture and/or the nitrogen oxide are plasma chemically generated in at least one plasma reactor by means of a thermal plasma. The thermal plasma can thereby be activated, for example, directly by means of an alternating-current voltage or a direct-current voltage or by a microwave irradiation. As hydrogen and nitrogen oxide can be generated in a thermal plasma, the procedure can be deployed in separate as well as combined nitrogen oxide and hydrogen production units. Compared to the likewise possible nitrogen oxide production by means of burners, the plasma chemical production has the advantage of improved dynamic properties for cold starting. Discharge forms with short discharge durations as spark discharges or non-thermal discharges, as they are, for example, generated by dielectrically impeded discharge arrangements represent possible alternatives to the thermal plasma.

A better efficiency in the production of the basic materials for ammonia production can thereby be achieved, in that the formation of hydrogen or the formation of the hydrogen-carbon monoxide-mixture is supported by a partial oxidation (POx) at a POx catalytic converter.

An alternative method for the production of hydrogen is the production of hydrogen by thermal vaporization of fuel and the subsequent reformation in a reformation catalytic converter. Preferably residual heat stored in the system can be used for this purpose, so that no additional energy is required for the production of hydrogen.

A possibility to deploy stored residual heat for the production of hydrogen is the vaporization of the fuel through recuperation in a counter current heat exchanger and/or the metering of fuel into a hot zone of the plasma reactor for vaporization. If one of the aforementioned methods is only sufficient to produce a partial vaporization of the acquired energy, a combination of both procedures—initially heating, respectively partial vaporization of the fuel by recuperation with subsequent vaporization of the already heated fuel in a hot zone of the plasma reactor—is possible.

As a hot zone for the fuel vaporization the electrode of the plasma reactor, which was heated by a preceding plasma operation, can be used. In so doing, the fuel is metered onto the hot electrode of the plasma reactor. The fuel can already be previously heated by recuperation, respectively partially vaporized. The heating of the electrode occurs, for example, in the phase of plasma chemical generation of the nitrogen oxide.

A further example of deploying stored residual heat for the hydrogen production is for the vaporization of fuel to result from the metering of the fuel and/or a fuel-air-mixture and/or a fuel-air-exhaust gas-mixture into a hot area in the direction of flow after the plasma zone. The plasma can in the process be further run, so that a sufficient heating of the gas stream is achieved by an uninterrupted application of energy into the reactant gas. This assures on the one hand that the temperature in the vaporization zone is sufficiently hot and on the other hand assures the temperature of the reformation catalytic converter is maintained so elevated, so that a rapid starting time of the catalytic converter can be actualized. By means of the inductively coupled plasma output, a rapid closed-loop temperature control can be achieved. As the fuel does not pass through the plasma area, negative influences in the yield of the reducing agent can be avoided, for example by a conversion of fuel into methane and the generation of undesirable products. The reformation of the fuel does not take place uncontrolled in the plasma but exclusively in the reformation catalytic converter.

Preferably a prerotation is impressed upon the gas stream in front of the vaporization zone of the fuel and/or in front of the reformation catalytic converter. In so doing, a prerotation of the gas stream in front of the vaporization zone of the fuel causes an improved homogenization of the fuel vapor-air-mixture. The place, at which the fuel is vaporized, should be located in an area with a high flow velocity, respectively with high velocity gradients. A prerotation of the gas stream in front of the reformation catalytic converter causes likewise an improved homogenization as well as an ideal oncoming flow into the reformation catalytic converter. A fluid admission of the reformation catalytic converter with the fuel being used can be avoided.

The reducing of the nitrogen oxides contained in the exhaust gas of the combustion source is thereby achieved, in that the ammonia formed in the storage catalytic converter is stored in the SCR-catalytic converter, and in that nitrogen oxides in the exhaust gas of the combustion source are reduced to nitrogen and water by the stored ammonia. By way of the storage of ammonia in the SCR-catalytic converter, ammonia demand peaks can be intercepted. Furthermore, an ammonia production and buffering independent of the operating conditions of the combustion source is possible.

The invention is explained in detail in the following description using the examples of embodiment depicted in the figures. The following is shown:

Figure 1:
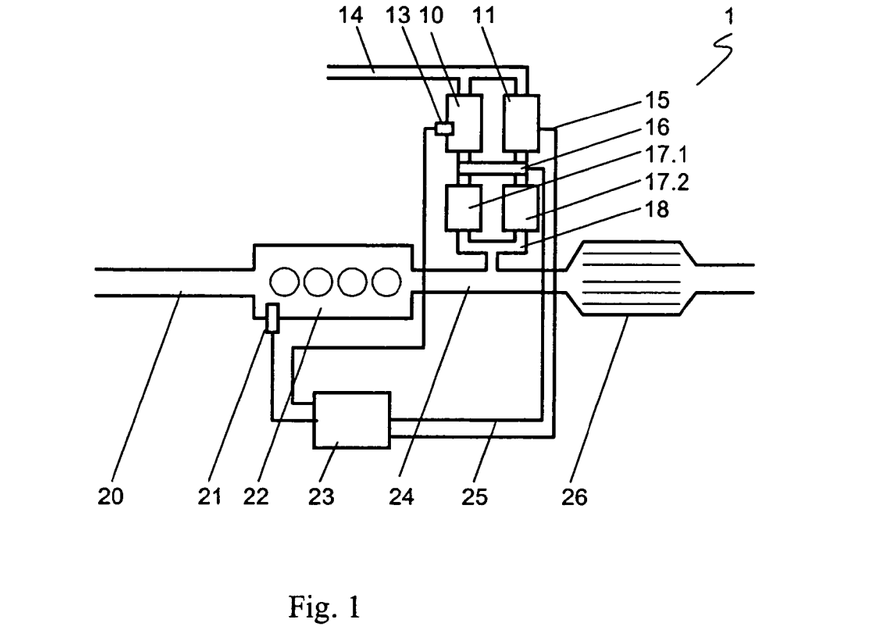
Figure 2:
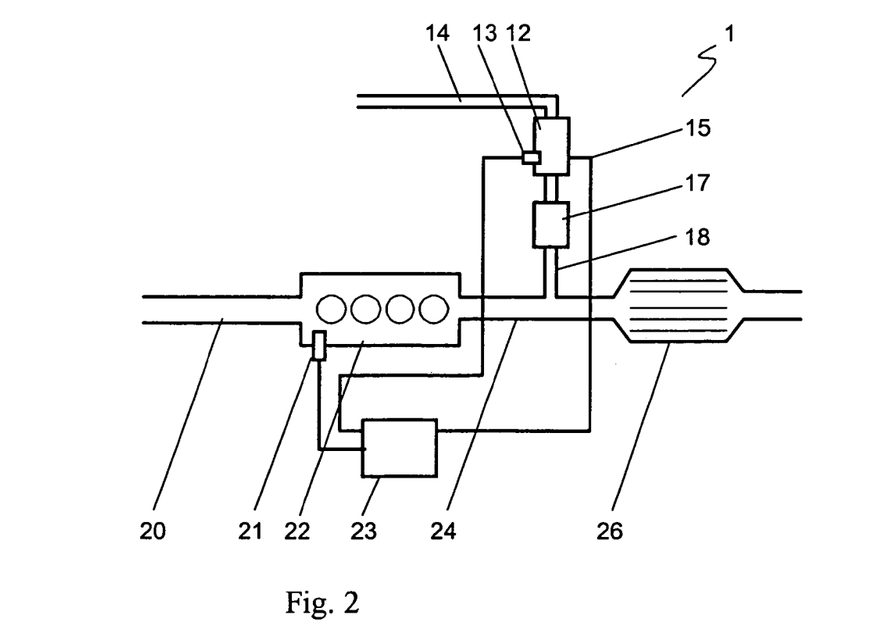
Figure 3:
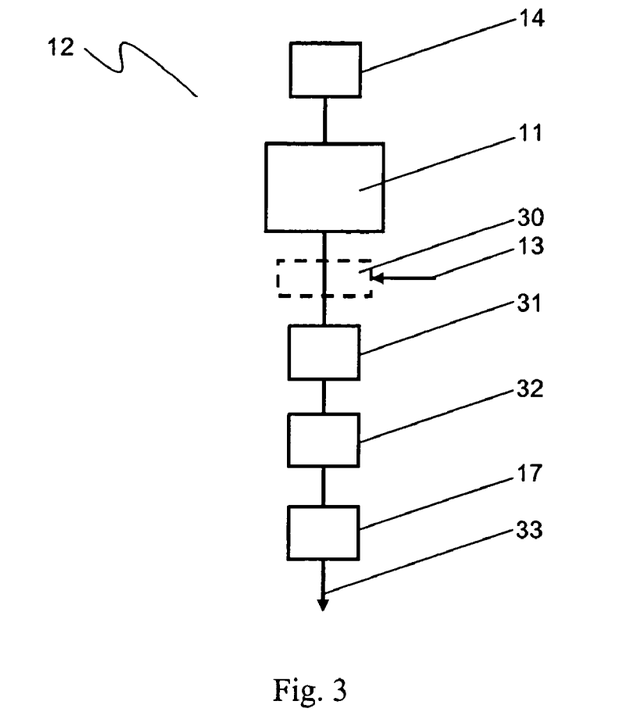
Figure 4:
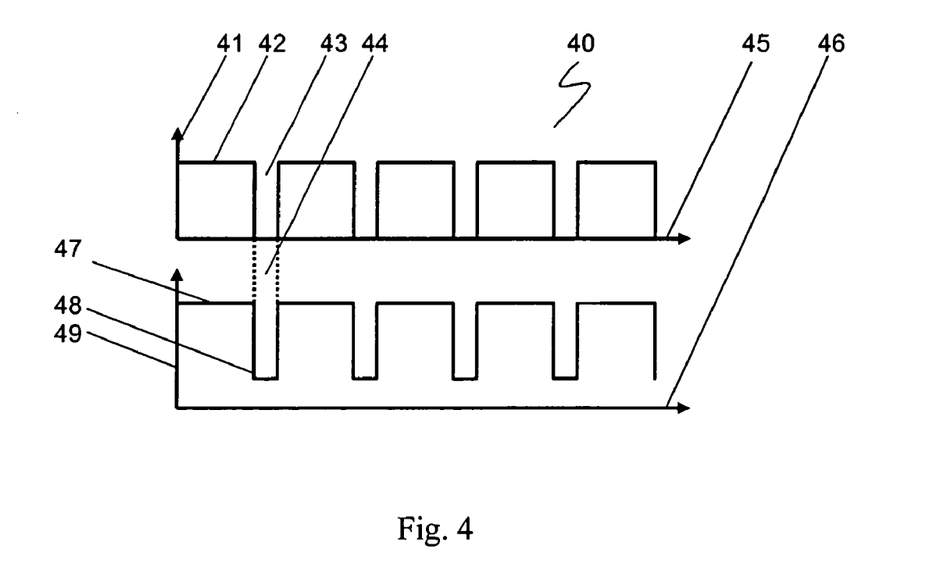

FIG. 1 a schematic depiction of an exhaust gas aftertreatment system of an internal combustion engine with separate production units for hydrogen and nitrogen oxide FIG. 2 a schematic depiction of an exhaust gas aftertreatment system of an internal combustion engine with a combined production unit for hydrogen and nitrogen oxide FIG. 3 a schematic depiction of a production unit for hydrogen and nitrogen oxide FIG. 4 a time sequence for a clocked plasma operation FIG. 1 shows schematically an exhaust gas aftertreatment system 1 for an internal combustion engine 22 with an air feed 20 and an SCR-catalytic converter 26. SCR-catalytic converters work according to the principle of selective catalytic reduction, in which nitrogen oxides ($NO_x$) are reduced to nitrogen and water by means of the reducing agent ammonia in exhaust gases containing oxygen. In the device according to the invention, the ammonia is produced from air or exhaust gas and fuel. For this purpose, provision is made for a hydrogen production unit 10 and a nitrogen oxide production unit 11. The hydrogen production unit 10 is supplied by way of an air feed 14 with air and by way of a fuel metering 13 with fuel. In another embodiment the air feed 14 can also carry exhaust gas or a mixture of air and exhaust gas. The hydrogen production unit 10 is embodied as a plasma reactor, in which fuel is delivered to a plasma, in which hydrogen and carbon monoxide are generated from the hydrocarbons of the fuel.

The nitrogen oxide production unit 11 is embodied as a plasma reactor, in which nitrogen and oxygen from the incoming air are converted to nitrogen oxide. In a first mode of operation the nitrogen oxide is delivered to a storage catalytic converter 17.1 by way of a reversible gas route and stored there. If then in a second mode of operation, hydrogen from a hydrogen production unit 10 is fed into the storage catalytic converter 17.1, the desired ammonia is generated at its noble metal setting from the stored nitrogen oxide and the hydrogen, which has been delivered, and delivered by way of a gas route 18 to the exhaust gas tract. During this second mode of operation, the nitrogen oxide from the nitrogen oxide production unit 11 is delivered to a second storage catalytic converter 17.2 by way of a reversible gas route 16 and stored there. If now the first mode of operation is switched back to again, nitrogen oxide is delivered to the storage catalytic converter 17.1 and stored there, while hydrogen is delivered to the second storage catalytic converter 17.2 and converted with the stored nitrogen oxide at the noble metal setting to ammonia.

The ammonia admixed into the exhaust gas tract 24 is delivered with the exhaust gas of the internal combustion engine 22 to the SCR-catalytic converter, where the $NO_x$ contained in the exhaust gas is reduced to nitrogen and water by means of the ammonia. To control the operations an engine management system 23 is assigned to the internal combustion engine 22, which by means of a gas route control signal 25 switches the reversible gas route 16 between the first and second mode of operation, controls the fuel metering 13 to the hydrogen production unit 10 and controls by way of an activation lead 15 the nitrogen oxide production unit 11 embodied as a plasma reactor. Furthermore, the engine management system 23 controls a fuel metering 21 of the internal combustion engine 22 and processes signals from lambda sensors, which are not depicted here.

In another form of embodiment the hydrogen production unit 10 can be designed as a thermal vaporizer. The vaporized fuel is mixed with incoming air and delivered to a reformation catalytic converter 32, which is not depicted here, in which the hydrocarbons from the fuel are converted to hydrogen and carbon monoxide. Furthermore, the nitrogen oxide production unit 11 can be designed as a $NO_x$ burner.

FIG. 2 shows schematically the exhaust gas aftertreatment system 1 for the internal combustion engine 22 with a combined hydrogen-nitrogen oxide-production unit 12 for hydrogen and nitrogen oxide. In the combined hydrogen-nitrogen oxide production unit 12 embodied as a plasma reactor, nitrogen oxide and hydrogen are produced in chronologically subsequent operational phases. In a first operational phase nitrogen oxide is produced in the plasma reactor from the air delivered by the air feed 14 and is stored in a storage catalytic converter 17. The storage catalytic converter 17 is set with noble metal, so that the hydrogen produced in a second operational phase can be converted with the nitrogen oxide to ammonia, which is fed into the exhaust gas tract via the gas route 18. The hydrogen is produced from fuel in the combined hydrogen-nitrogen oxide-production unit 12, which is delivered to the combined hydrogen nitrogen oxide production unit 12 by means of the fuel metering 13. In the plasma of the combined hydrogen-nitrogen oxide production unit 12 the hydrocarbons of the fuel are converted to hydrogen and carbon monoxide.

As according to the form of embodiment in accordance with FIG. 1, in the embodiment in accordance with FIG. 2, combustion air by way of the air feed 20 and fuel by way of the fuel metering 21 are delivered to the internal combustion engine 22. The operations are controlled by the engine management system 23, which especially controls the operating phases of the combined hydrogen-nitrogen oxide-production unit by way of the activation lead 15. Also in this case, the ammonia produced reduces the nitrogen oxides contained in the exhaust gas to nitrogen and water in the SCR-catalytic converter.

In a form of embodiment an electrode can be designed as a hollow electrode, through which the fuel is introduced, for the combined hydrogen-nitrogen oxide-production unit 12, which is embodied as a plasma reactor. The heating up of the electrode occurring in the plasma operation is then used for the vaporization of the fuel. The vaporization of the fuel outside of the plasma with the subsequent conversion to hydrogen and carbon monoxide in a downstream reformer is advantageous to the effect that a higher proportion of the desired products, hydrogen and carbon monoxide, arise than during a conversion of the fuel in a plasma reactor.

In an additional form of embodiment of the combined hydrogen nitrogen-oxide-production unit 12, this unit can be designed in this phase of operation of the hydrogen production as a thermal vaporizer, in which the fuel is carried in a hydraulic flip to the electrodes heated up in the preceding plasma operation and vaporized there. To improve the vaporization, air deflector plates or torsion bodies can be disposed in the gas route before the vaporization point.

FIG. 3 shows schematically the construction of the combined hydrogen-nitrogen-oxide-production unit 12. By way of the air feed 14, air and/or exhaust gas is delivered to the nitrogen oxide production unit 11. The nitrogen oxide produced there in the first operating phase is delivered to the storage catalytic converter 17 and stored there. In the second operating phase, a mixture formation zone 30 is produced on the hot surface areas in the nitrogen oxide production unit 11 by means of the introduction of fuel by way of the fuel metering 13. In this case the nitrogen oxide production unit 11 can at least periodically be operated further, in order to maintain the temperature in the mixture formation zone 30. To improve the delivery of the mixture to the reformation catalytic converter 32, provision is made for air guidance cross members. In a form of embodiment air guidance cross members can be disposed in the direction of flow in front of the mixture formation zone 30 to improve the vaporization in this zone. The hydrogen produced in the second operating phase in the reformation catalytic converter 32 is converted in the storage catalytic converter 17 with the nitrogen oxide stored there to ammonia by means of an input jet 33 fed into the exhaust gas tract 24, which is not depicted here.

In another form of embodiment, the mixture formation zone 30 is disposed in the direction of flow after the plasma zone and outside of the same. The plasma operation can then also take place during the metering of fuel and serves to heat up the gas stream. In so doing, the temperature in the vaporization zone can be controlled, and a quick heating of the of the reformation catalytic converter 32 can be achieved as well. By injecting the fuel outside of the plasma zone, the undesired production of by-products in the plasma, as, for example, the conversion of fuel to methane, can be avoided.

FIG. 4 shows the chronological progression for a timing 40 for a clocked plasma operation for the subsequently occurring production of nitrogen oxide and hydrogen in the combined hydrogen-nitrogen oxide-production unit 12, which is not depicted here and is embodied as a plasma reactor for the production of nitrogen oxide and as a thermal vaporizer for the fuel to produce hydrogen. A plasma output is plotted above a time axis 45. Furthermore, a lambda value 49 is plotted above a second time axis 46 running parallel to the first time axis 45. In a first operating phase, the plasma output is adjusted to a plasma set point 42 and the lambda value 49 to a lean value 47, which essentially corresponds to the delivery of air. In a second operating phase, the plasma output 41 is on the one hand reduced to zero by way of a synchronization 44 and furthermore the lambda value is lowered to a rich value 48. The rich value 48 is advantageously adjusted to a lambda of 0.35, as then the optimal ratio of 1 of oxygen to carbon for the production of hydrogen and carbon monoxide is present. The adjustment of lambda can thereby result for the reason that the ratio of incoming air to fuel amount, which vaporizes at the heated electrodes, is correspondingly selected. To improve the vaporization, the fuel and/or the incoming air can be warmed in a heat exchanger. The heat arising in the reformation catalytic converter or in the SCR catalytic converter during the exothermal reactions taking place there can simultaneously be used as a heat source. An advantage of such a form of embodiment is that the plasma output is reduced to zero during a second operational phase and as a result a reduced energy consumption can be targeted.

The invention claimed is:

1. A device to produce ammonia as a reducing agent for a selective catalytic reduction (SCR) of nitrogen oxides in an exhaust gas of a combustion source, the device comprising:
    a reactor comprising a nitrogen oxide production unit configured to produce nitrogen oxide connected in series with a hydrogen production unit configured to produce hydrogen, wherein the reactor is separated from the combustion source and its exhaust gas duct, and wherein the nitrogen oxide and hydrogen are produced in alternating first and second operational phases; and
    a storage catalytic converter connected in series with the reactor for storage of the nitrogen oxide and formation of ammonia;
    wherein the nitrogen oxide produced in the nitrogen oxide production unit and the hydrogen produced in the hydrogen production unit are delivered to and converted to ammonia in the storage catalytic converter, and wherein the ammonia is admixed with the exhaust gas in the direction of flow in front of a SCR-catalytic converter.

2. A device according to claim 1, wherein fuel or a fuel-air-mixture or a fuel-air-exhaust gas-mixture is delivered to the hydrogen production unit and air or exhaust gas is delivered to a nitrogen oxide production unit.

3. A device according to claim 1, wherein the hydrogen production unit and the nitrogen oxide production unit are separate units, and wherein the hydrogen production unit and the nitrogen oxide production unit are connected by way of a reversible gas route alternately with at least two storage catalytic converters each configured for the storage of nitrogen oxide and the formation of ammonia.

4. A device according to claim 1, wherein the storage catalytic converter, of which there is at least one, is embodied as a nitrogen oxide storage with an additional noble metal setting.

5. A device according to claim 4, wherein the storage catalytic converter is embodied with carbonates as active storage components.

6. A device according to claim 5, wherein the carbonates as active storage components is barium carbonate, barium oxide or sodium carbonate.

7. A device according to claim 4, wherein the noble metal setting is embodied as platinum setting.

8. A device according to claim 1, wherein the hydrogen production unit or the nitrogen oxide production unit are embodied as a plasma reactor.

9. A device according to claim 8, wherein a fuel-air-mixture with a lambda smaller than 1 is delivered to the hydrogen production unit.

10. A device according to claim 9, wherein the hydrogen production unit is embodied as a thermal vaporizer for the fuel with a downstream reformation catalytic converter.

11. A device according to claim 10, wherein at least one electrode of the plasma reactor is embodied as a thermal vaporizer for the fuel.

12. A device according to claim 11, wherein at least the one electrode of the plasma reactor is embodied as a hollow electrode, in which the fuel is delivered to the electrode.

13. A device according to claim 12, wherein provision is made for a counter current heat exchanger for a transmission of heat energy from a product gas escaping from a reformation catalytic converter or a gas stream escaping from the plasma reactor to a reactant gas from air and fuel delivered to the thermal vaporizer.

14. A device according to claim 13, wherein the plasma reactor is turned off during the thermal vaporization of the fuel.

15. A device according to claim 14, wherein during the thermal vaporization of the fuel, the plasma reactor is turned on and in that the fuel or a fuel-air-mixture or a fuel-air-exhaust gas mixture is delivered to an area in the direction of flow after the plasma zone.

16. A device according to claim 15, wherein air guidance cross members are disposed in an air feed in the direction of flow in front of the thermal vaporizer for the fuel or in front of the reformation catalytic converter.

17. A device according to claim 9, wherein the lambda is between 0.33 and 0.66.

18. A device according to claim 1, wherein the SCR-catalytic converter is designed as an ammonia storage.

19. A device according to claim 1, wherein the combustion source is an internal combustion engine.

20. A device according to claim 1, wherein the storage catalytic converter includes a nitrogen oxide storage and a downstream catalytic converter.

21. A device according to claim 20, wherein the nitrogen oxide storage and the downstream catalytic converter are joined together in one structural unit.

22. A method to produce ammonia as a reducing agent for the selective catalytic reduction (SCR) of nitrogen oxides in an exhaust gas of a combustion source, the method comprising:
producing a nitrogen oxide and one of a hydrogen and a hydrogen-carbon monoxide-mixture in alternating nitrogen oxide and hydrogen production phases in a reactor comprising a nitrogen oxide production unit configured to produce the nitrogen oxide connected in series with a hydrogen production unit configured to produce the hydrogen, wherein the reactor is separated from the combustion source and its exhaust gas duct;
storing the nitrogen oxide in a storage catalytic converter connected in series with the reactor;
delivering the one of the hydrogen and the hydrogen-carbon monoxide-mixture to the storage catalytic converter;
converting the one of the hydrogen and the hydrogen-carbon monoxide-mixture and the stored nitrogen oxide catalytically to ammonia in the storage catalytic converter; and
admixing the ammonia with the exhaust gas in the direction of flow in front of a SCR-catalytic converter.

23. A method according to claim 22, further comprising producing the one of the hydrogen and the hydrogen-carbon monoxide-mixture from one of a fuel, a fuel-air-mixture, and a fuel-air/exhaust gas-mixture and producing the nitrogen oxide unit from one of air and exhaust gas.

24. A method according to claim 23, wherein hydrogen and nitrogen oxide from two separate hydrogen and nitrogen oxide production units are delivered alternately to two subsequently connected storage catalytic converters for the alternate storage of nitrogen oxide and for the production of ammonia, whereby the assignment of the gas streams results by way of reversible gas routes to the storage catalytic converters.

25. A method according to claim 23, further comprising producing the one of the hydrogen and the hydrogen-carbon monoxide-mixture or the nitrogen oxide are plasma chemically produced in at least one plasma reactor by a thermal plasma.

26. A method according to claim 25, wherein hydrogen formation or the formation of the hydrogen-carbon monoxide-mixture through a partial oxidation (POx) is supported at a POx catalytic converter.

27. A method according to claim 26, wherein the production of hydrogen by means of thermal vaporization of fuel and the subsequent reformation result in a reformation catalytic converter.

28. A method according to claim 27, wherein the fuel is vaporized by recuperation in a counter current heat exchanger or by the metering in of fuel into a hot zone of the plasma reactor.

29. A method according to claim 27, wherein the fuel is metered onto a hot electrode of the plasma reactor.

30. A method according to claim 27, wherein the vaporization of fuel by the metering in of fuel and/or a fuel-air-mixture and/or a fuel-air-exhaust gas-mixture results in a hot area in the direction of flow after the plasma zone.

31. A method according to claim 22, wherein a prerotation is impressed upon the gas stream in front of the vaporization zone of the fuel and/or in front of the reformation catalytic converter.

32. A method according to claim 22, wherein the ammonia formed in the storage catalytic converter is stored in the SCR-catalytic converter and wherein nitrogen oxides in the exhaust gas of the combustion source are reduced by the stored ammonia to nitrogen and water.

33. A method according to claim 22, wherein the combustion source is an internal combustion engine.

34. A method according to claim 22, wherein the storage catalytic converter includes a nitrogen oxide storage and a subsequently connected catalytic converter.

* * * * *

UNITED STATES PATENT AND TRADEMARK OFFICE
CERTIFICATE OF CORRECTION

| | |
|---|---|
| PATENT NO. | : 7,678,352 B2 |
| APPLICATION NO. | : 11/602898 |
| DATED | : March 16, 2010 |
| INVENTOR(S) | : Breuer et al. |

It is certified that error appears in the above-identified patent and that said Letters Patent is hereby corrected as shown below:

Col. 12, line 19, claim 23: "oxide unit from one" should read --oxide from one--

Col. 12, lines 28-29, claim 25: "claim 23, further comprising producing the one of the" should read --claim 24, wherein the one of the--

Signed and Sealed this

Twenty-third Day of November, 2010

David J. Kappos
*Director of the United States Patent and Trademark Office*